(12) United States Patent
Taylor

(10) Patent No.: US 8,113,528 B2
(45) Date of Patent: Feb. 14, 2012

(54) TWIST GRIP STEERABLE, LEVER-DRIVEN WHEELCHAIR

(76) Inventor: William Taylor, Lakeway, TX (US)

( * ) Notice: Subject to any disclaimer, the term of this patent is extended or adjusted under 35 U.S.C. 154(b) by 0 days.

(21) Appl. No.: 13/092,482

(22) Filed: Apr. 22, 2011

(65) Prior Publication Data

US 2011/0254245 A1   Oct. 20, 2011

Related U.S. Application Data

(63) Continuation-in-part of application No. 12/799,146, filed on Apr. 20, 2010, now abandoned.

(51) Int. Cl.
*B62M 1/16* (2006.01)
(52) U.S. Cl. ............... 280/250.1; 280/211; 280/244; 280/282
(58) Field of Classification Search .......... 280/211, 280/244, 246, 250.1, 253, 255, 258, 263, 280/282
See application file for complete search history.

(56) References Cited

U.S. PATENT DOCUMENTS

| | | | |
|---|---|---|---|
| 2,643,898 A * | 6/1953 | Everest et al. | 280/240 |
| 3,666,292 A * | 5/1972 | Bartos | 280/234 |
| 4,364,580 A | 12/1982 | Shapcott | |
| 4,586,723 A | 5/1986 | Nabinger | |
| 4,705,284 A | 11/1987 | Stout | |
| 4,811,964 A | 3/1989 | Horn | |
| 4,865,344 A * | 9/1989 | Romero et al. | 280/255 |
| 5,028,064 A | 7/1991 | Johnson | |
| 5,775,708 A * | 7/1998 | Heath | 280/234 |
| 5,865,455 A | 2/1999 | Taylor | |
| 5,988,661 A | 11/1999 | Garfinkle | |
| 6,224,078 B1 * | 5/2001 | Tidcomb | 280/250.1 |
| 6,352,274 B1 | 3/2002 | Redman | |
| 6,409,195 B1 | 6/2002 | Adams | |
| 6,557,879 B2 | 5/2003 | Caldwell | |
| 6,916,032 B2 * | 7/2005 | Wong | 280/244 |
| 7,344,146 B2 | 3/2008 | Taylor | |
| 7,401,535 B2 | 7/2008 | Blaschke | |
| 7,584,976 B2 | 9/2009 | Bayne | |

* cited by examiner

*Primary Examiner* — Anne Marie M Boehler
(74) *Attorney, Agent, or Firm* — Jackson Walker, LLP

(57) ABSTRACT

A racing wheelchair is disclosed. The racing wheelchair may have a pair of rear wheels and a steerable single front wheel. The rear wheels may be independently driven by a lever, through a derailer and a chain, such that pushing one of the two levers will move one of the wheels but not the other. The front wheel is steerable by twist grips located at the removed end of the levers. Brake assemblies and shifter assemblies of the derailers are located adjacent the twist grip, and may be rigidly mounted to the push lever or mounted to the twist grip to rotate therewith.

16 Claims, 7 Drawing Sheets

TWIST GRIP STEERABLE, LEVER-DRIVEN WHEELCHAIR

This application is a continuation-in-part of U.S. patent application Ser. No. 12/799,146, filed Apr. 20, 2010 now abandoned, and incorporates the by reference the specifications and drawings thereof.

FIELD OF THE INVENTION

This invention relates to the field of wheelchairs, more specifically wheelchairs that may be used for racing.

SUMMARY OF THE INVENTION

Applicant provides for a sport or racing wheelchair that can achieve greater speeds and longer distances with less exertion. This chair is propelled with push levers utilizing tricep and pectoralis muscles in a "thrust-relax" cycle that is more ergonomic than using a rotary crank or push rims. Each push lever is attached to a drive sprocket. Each sprocket is in turn connected by a bicycle chain to a rear axle mounted gear cassette that provides for multiple gear ratios and thereby for different speeds. Gear selection is made with the use of a separate derailer for each rear gear cluster. Turning is accomplished by turning the front wheel fork by rotating hand grips on the push levers, which are in turn connected to the front wheel fork by cables. This apparatus provides an alternative means of sprint and distance wheelchair racing with improved ergonomics and improved performance.

A racing wheelchair is disclosed. The racing wheelchair may have a pair of rear wheels and a steerable single front wheel. The rear wheels may be independently driven by a lever, through a derailer and a chain, such that pushing one of the two levers will move one of the wheels but not the other. The front wheel is steerable by twist grips located at the removed end of the levers. Brake assemblies and shifter assemblies of the derailers are located adjacent the twist grip, and may be rigidly mounted to the push lever or mounted to the twist grip to rotate therewith.

DETAILED DESCRIPTION OF THE INVENTION

Figure 1:
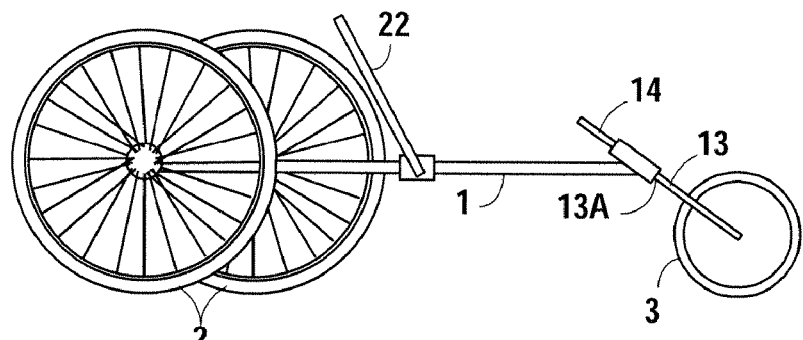
FIG. 1 is a right side elevational view of an embodiment of Applicant's racing wheelchair.
Figures 2A, 2B:
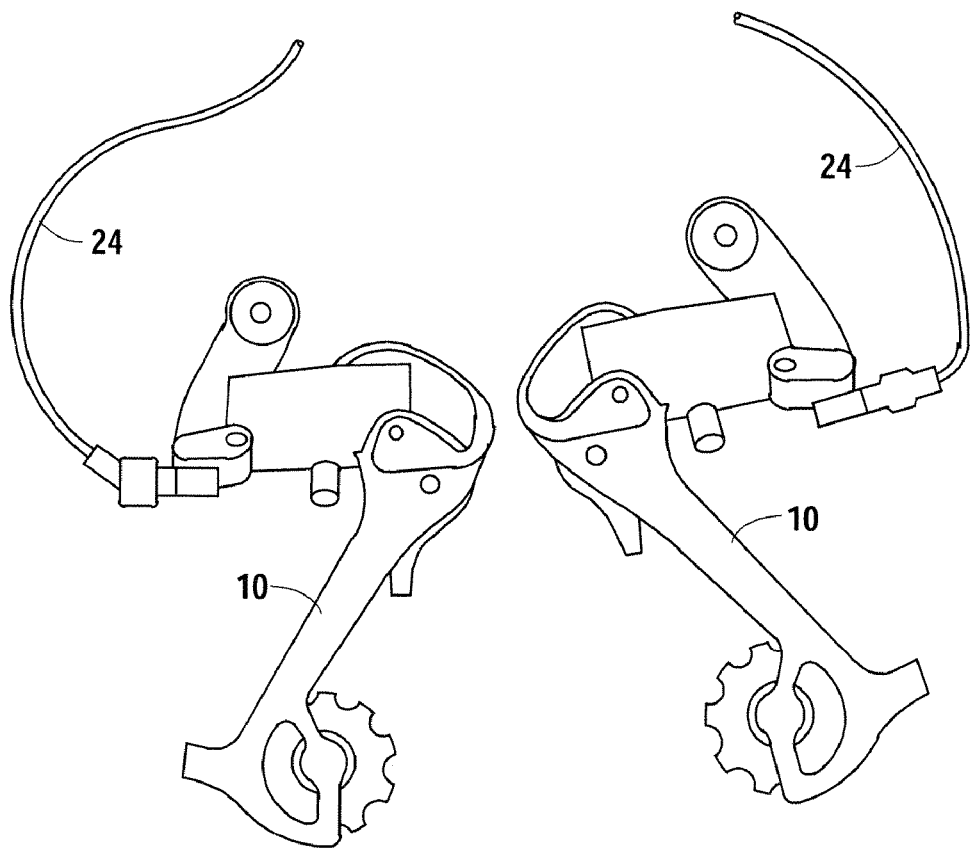
FIGS. 2A and 2B are elevational views of left and right derailers, showing them to be mirror images of each other.
Figures 3A, 3B:
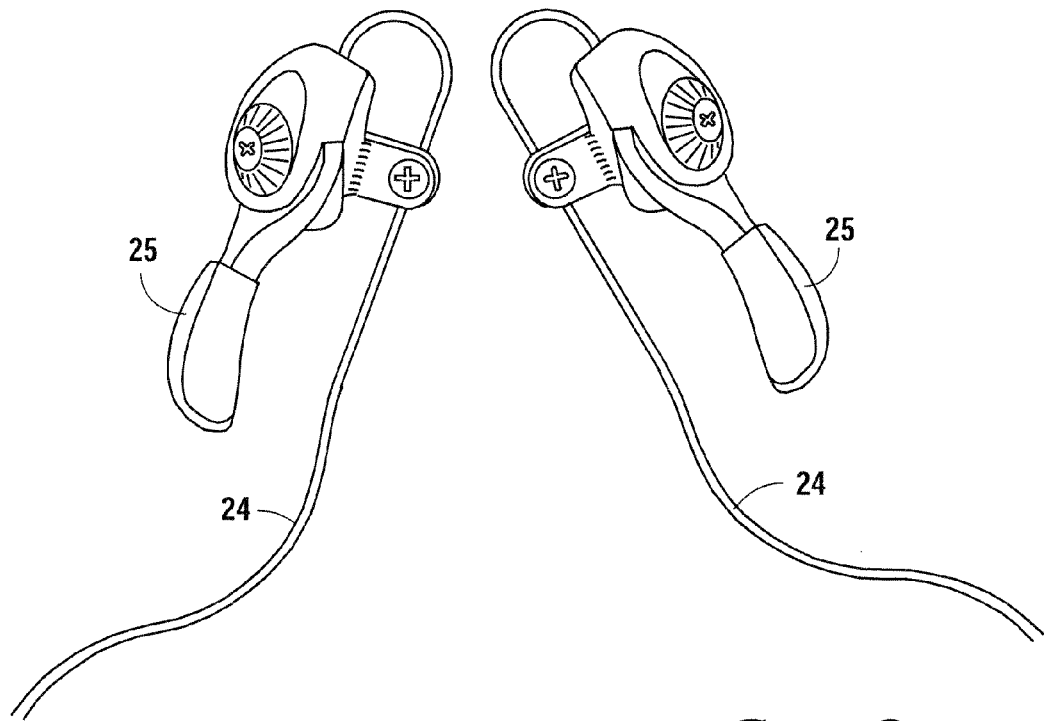
FIGS. 3A and 3B are left and right shifters in respective views showing them to be minor images of each other.
Figure 4:
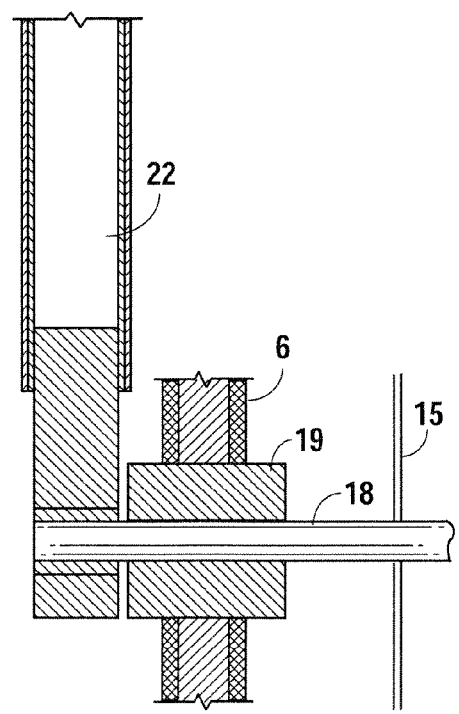
FIG. 4 is a cross-section view of the front axle with its attached push lever, hub, bearings, and forward drive sprocket.
Figure 5:
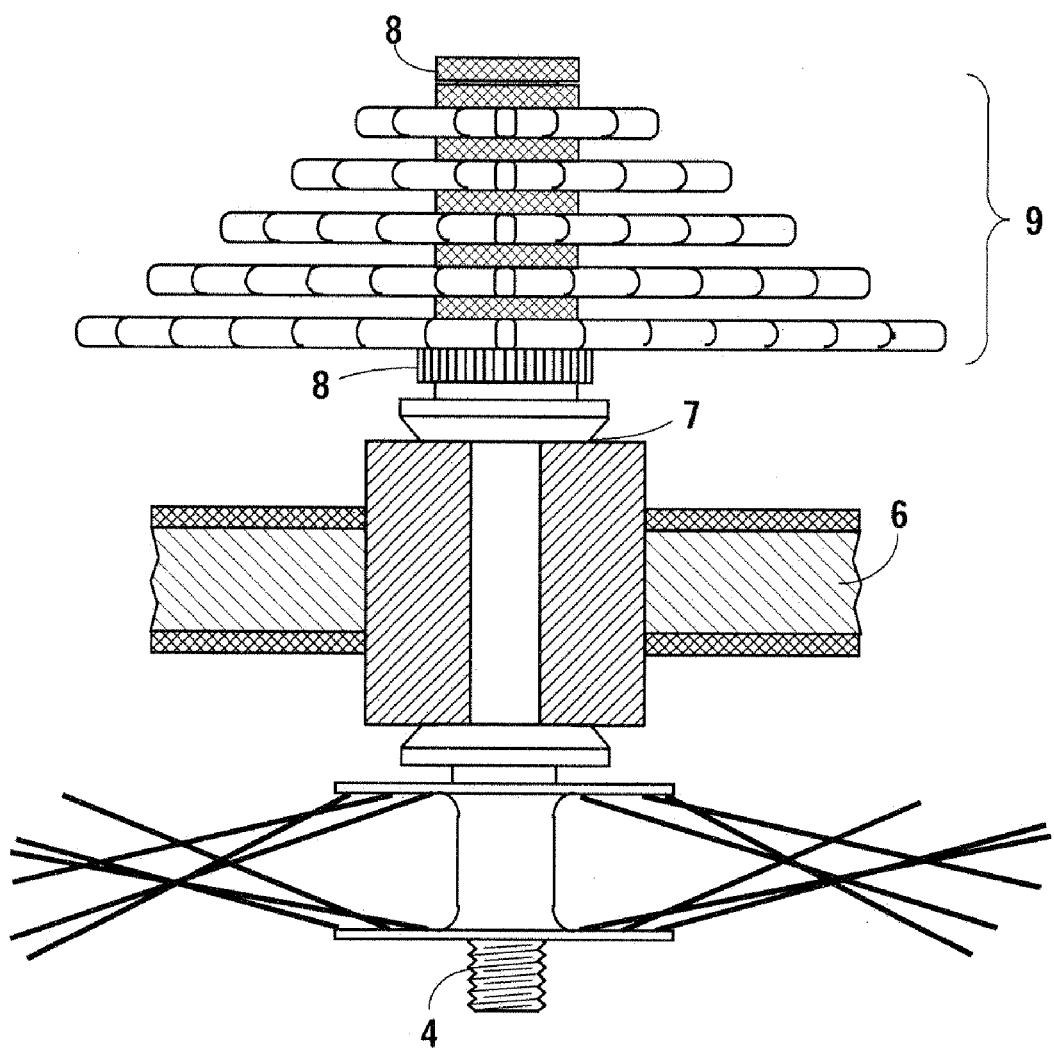
FIG. 5 is a cross-section view of the rear axle illustrating its hub, frame, wheel, and sprocket cluster on the cassette body.

This Application incorporates by reference, U.S. Pat. No. 7,344,146 issued to William G. Taylor on Mar. 18, 2008.

With reference to the above drawings, it is seen that the wheelchair (1) has two large rear wheels (2) and a single typically smaller, steerable front wheel (3). The rear wheels are fixed to the rear axles (4), which are mounted in the rear wheel hub (7) of the chair frame (6). Inboard of the left and right rear axle hubs, sprocket clusters (9) are mounted on cassette bodies (8) which are, in turn, fixed to their respective axles. With reference to the above drawings it is seen that the left and right push levers (22) are fixed to axles (18) which are mounted in hubs (19) on the frame. It is also seen that the inboard ends of these axles have the left and right drive sprockets (15) respectively mounted on them. The left and right drive sprockets are connected to the rear wheel sprocket clusters with left and right bicycle chains. With respect to the drawings it is seen that each derailer is connected by cables (24) to shifter mechanisms (25) mounted on each push lever, such that gear selection for each rear wheel can be made independently by manipulating the corresponding shifter mechanism.

With reference to the above drawings derailers (10) are shown to be minor images of each other. With reference to the above drawings it is seen that the front drive sprockets (15) are mounted directly on the front axles, such that when the push lever rotates its axle forward the sprocket also rotates forward, and when the push lever rotates the axle backward, the sprocket rotates backward. Each wheel has an associated brake disc and caliper mounted on the frame near the wheel. These brakes are activated by hand levers (28) on the push lever.

With respect to the above drawings it is seen that the front wheel fork (13) has a steering lever (14) fixed to it. Lever (14) is connected by cable (31) to the hand grip assembly on the left and right push lever. The hand grip member (34) can be twisted left or right thus moving the steering lever left or right to change the direction of the front wheel or wheels.

Figures illustrate fork assembly (13) comprising a fork (13A) with a pair of depending members and front wheel (3) engaged to the depending members of fork (13A). Steering lever (14) is attached to fork (13A). Fork (13A) is pivotally mounted in a rigid steering head (15) which steering head is fixedly mounted to frame (6) as illustrated.

The figures also illustrate push levers (22) having a removed end with a captured blind nut (22A) attached on the interior thereto near an upper perimeter (22B) thereof. A shifter or derailer mechanism (24) is engaged with each of the push levers (22) as set forth below. Shift mechanisms (25) are comprised of the cables (24) and hand levers (28).

Figure 6A:
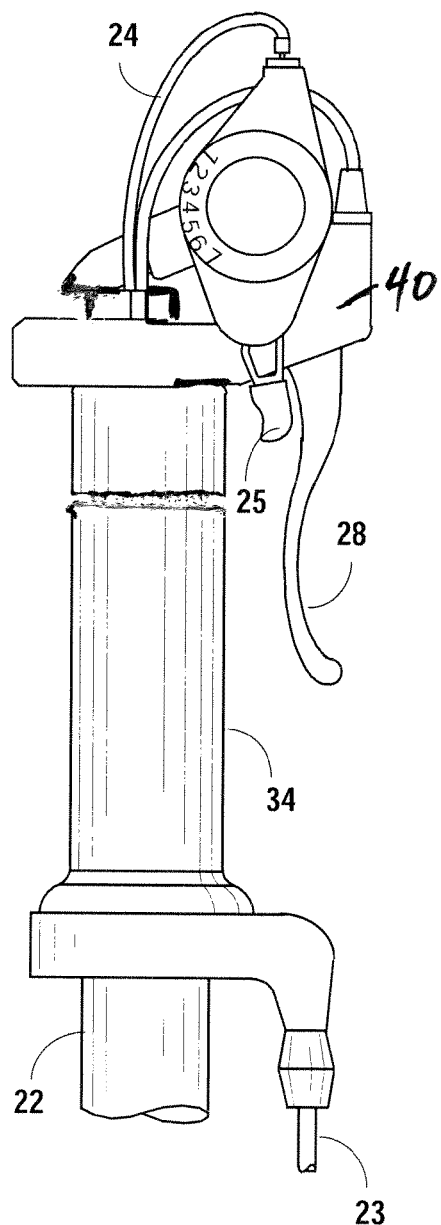
FIGS. 6A and 6B are side elevational views of the upper end of the right and left push levers showing the shifters, brake levers, and rotating directional selectors.
Figure 6B:
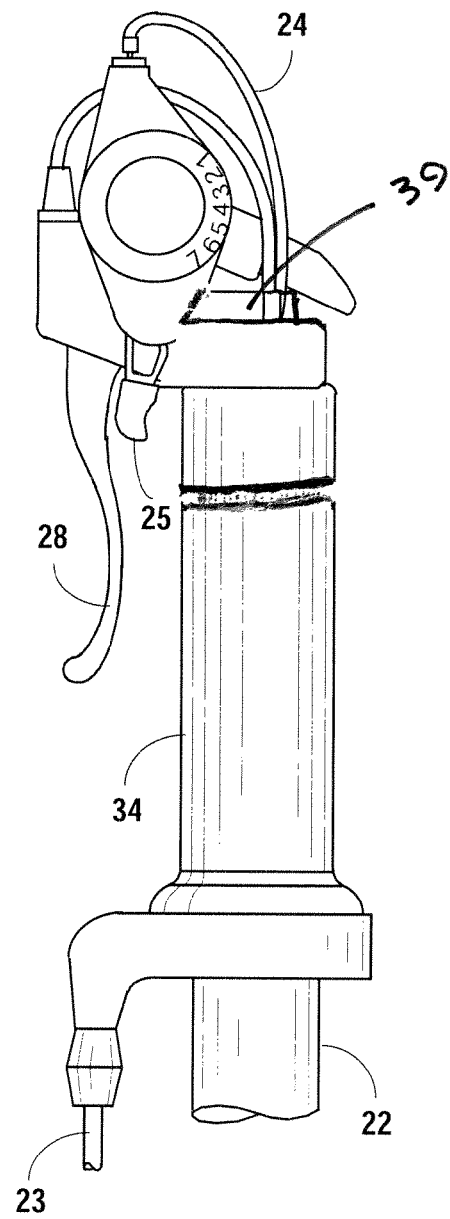
Figure 7:
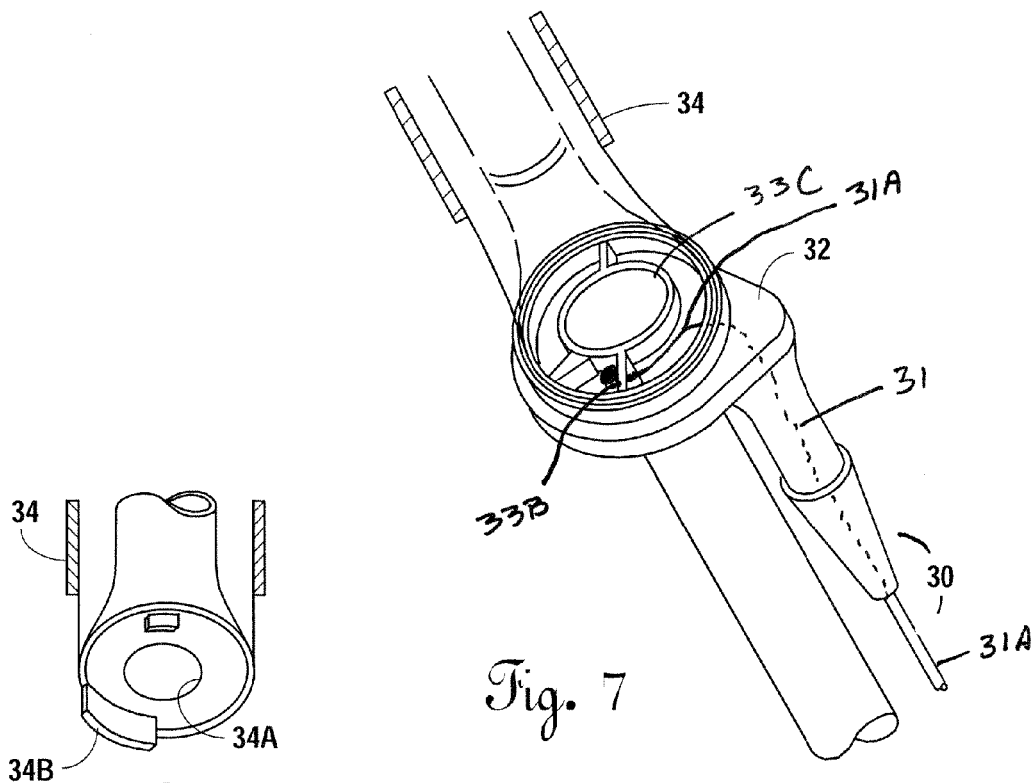
FIGS. 7 and 8 are perspective views (FIG. 8 exploded) of the manner in which the twist grip coupler and brake cable housing engage one another and the removed end of the push lever such that when the twist grip is rotated the cable to which the coupler is engaged is taken up.
Figure 8:
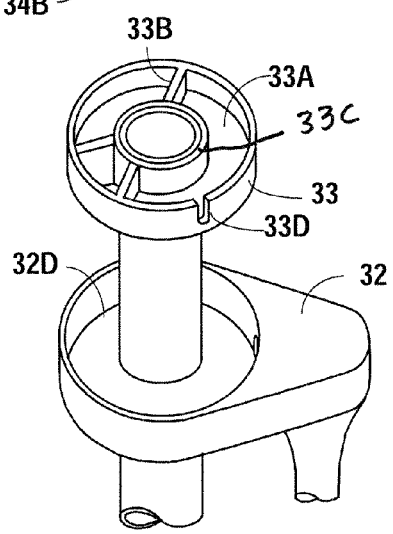

Turning now to FIGS. 6A, 6B, and 7 through 12, it is seen that levers (22) have on the removed ends thereof twist grip assemblies which comprise at least twist grip members (34) and cable assembly (30). Cable assembly (30) is seen to comprise a cable (31) having a first end (31A) and a second end (31B) and a cable housing (36) having a first end (36A) and a second end (36B). The first end of the cable housing (36) may be engaged to a cable base (32) which itself is engaged or mounted to removed end of lever (22). Cable base (32) includes a recessed portion (32A). The recessed portion (32A) is designed to rotatably receive a coupler (33) therein. Coupler (33) may include one or more bays (33A) and may include one or more walled members (33B). Coupler (33) is seen to have an inner-perimeter (33C) which may be adapted to rotate within the recess about the removed end of lever (22) as illustrated. Coupler (33) may include a slot (33D), hole or other means for receiving first end (31A) of cable therethrough. Typically, first end of cable (31A) is swaged so as to attach to either a walled member (33B) (as seen in FIG. 7) or a slot or hole or otherwise such that when coupler (33) rotates, it will take up or pull cable (31) through cable housing (36). Twist grip member (34) is designed to rotate on or with respect to the push lever and to couple or engage coupler (33) such that when the twist grip member (34) is rotated, it takes up cable (31).

Figures 9, 10:
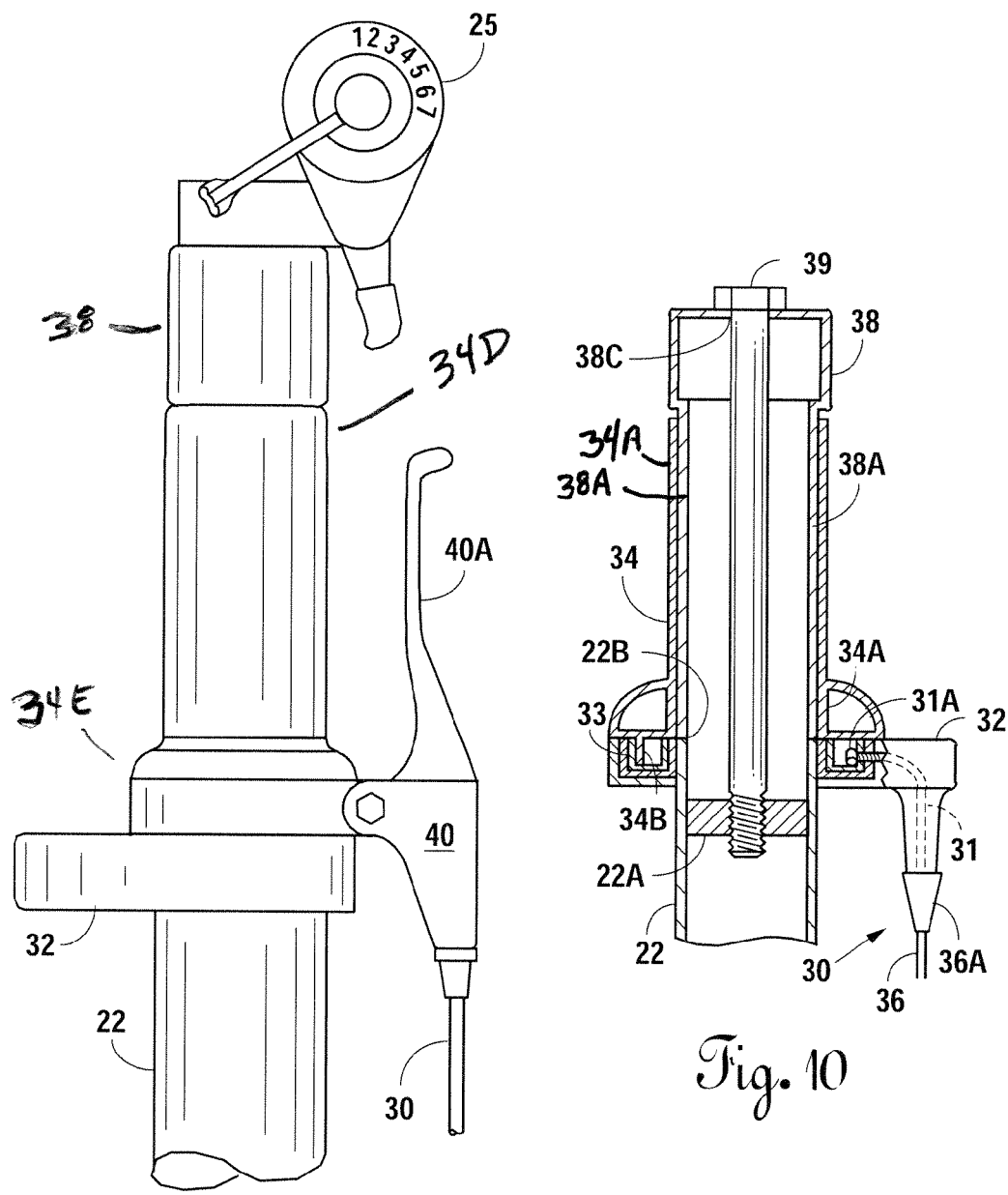
FIGS. 9 and 10 are side elevational and cutaway views of the manner in which the twist grip assembly couples to the cable and rotates freely with respect to the removed end of the lever.
Figure 11:
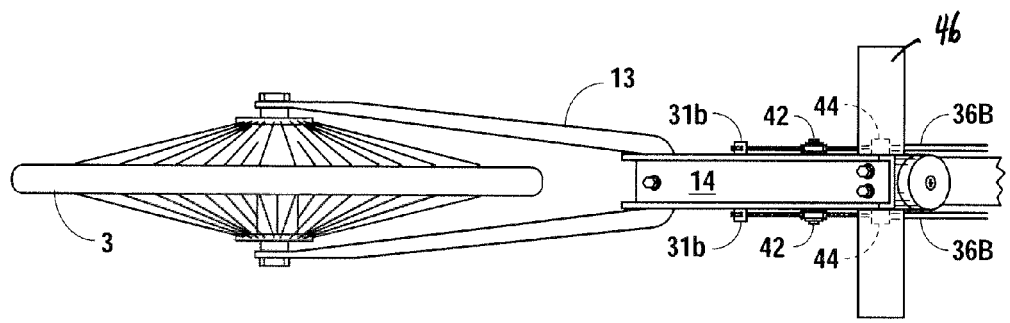
FIG. 11 illustrates alternate embodiments of a steering lever (14) for use with Applicant's racing wheelchair.

Twist grip member (34) may include inner-sleeve (34A) for rotating upon end cap sleeve (38A) as see in FIG. 10. Twist grip member (34) may include a depending engagement arm (34B) that may couple with coupler (33) such that it engages one of the bays (33A) or walled members (33B) thereof. Then, when twist grip member (34) is rotated, the engagement arm (34B) will cause coupler (33) to rotate. Coupler (33) being engaged to cable first end (31A) will allow cable first end to be taken up. In an alternative embodiment (not shown), first cable end (31A) may directly engage engagement arm (34B) and no coupler would be used.

Figure 12:
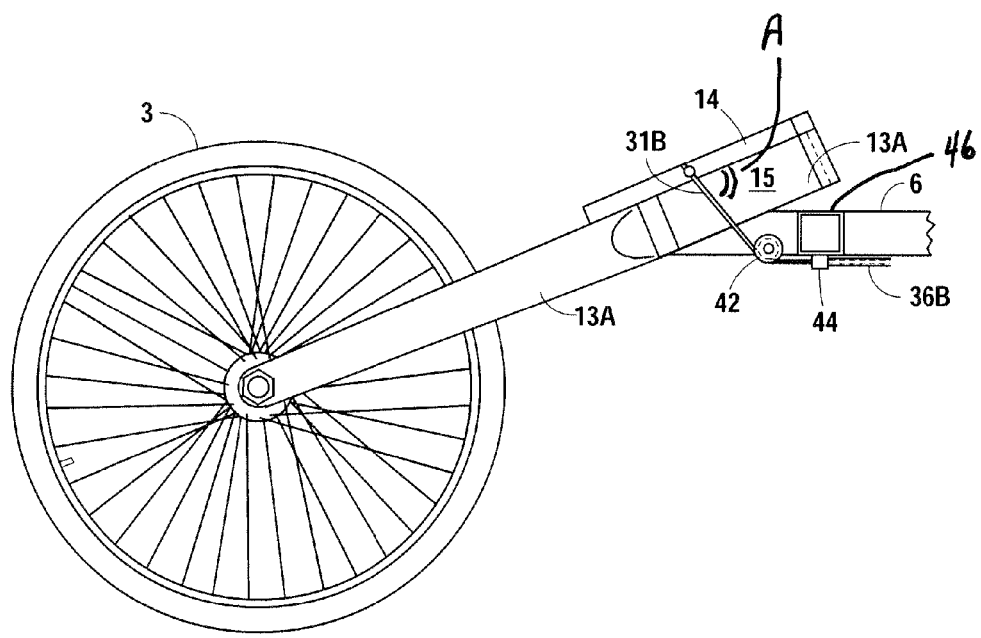
FIG. 12 is a side elevational view of the manner in which the cable housing is fixed at a removed end thereof with respect to the frame and which removed end the cable extends therefrom, about a pulley and attaches to a lever of the fork assembly.

As seen in FIG. 12, when the cable (31) is taken up, removed end (31B) will cause fork assembly (13) to rotate. That is to say fork assembly (13) includes fork (13A) and front wheel (3), and is pivotally engaged to steering head (15). Fork assembly (13) may have steering lever (14) engaged either longitudinally (see FIG. 12) or laterally (see FIG. 1). Rotating a twist grip will cause the fork assembly (13) to pivot in a first direction. Twisting the other twist grip, on the other push lever, will cause the fork to turn or pivot in a second direction. Pulleys (42) may be mounted on frame (6) aligned with clamp (44) which clamp (44) rigidly attaches second end (36B) of cable housing to the frame (6). Pulleys (42) allow a change in direction, so in a preferred embodiment, the cable end (31B) will attach to steering lever (14) about perpendicular thereto (see angle A, FIG. 12). First end (36A) of cable housing is attached fixedly with respect to the lever, here, attached to cable base (32) as seen in FIG. 10. Illustrated in FIG. 12, it is seen that two cable house end (36B) may be attached to a laterally mounted foot bar (46).

Turning back to a twist grip assemblies, it is seen that an end cap (38) may be provided that will typically include inner-sleeve (38A), a cap portion (38B), which has a hole (38C) on a removed wall thereof for receipt of hold-down bolt (39) there-through. It is seen that inner sleeve (38A) is dimensioned to butt-up against upper perimeter (22B) of push lever (22) as the hold-down bolt is tightened to the blind nut (22A). It is seen that perimeter (34A) will be able to ride on this fixed sleeve as twist grip member (34) is rotated and longitudinal movement of twist grip (34) will be limited by coupler base (32) and coupler (33) on a lower end and by cap member (38) on an upper end. This typically is about ⅛ to 1/16 of an inch or so of up and down longitudinal movement permitted by the "sandwiched" twist grip member (34).

As seen in FIG. 9, shifter mechanism (25) may be engaged to hold-down bolt (39) to cap (38). However, (not shown) the upper end of twist grip member (34) may receive shifter (25) thereon so that it rotates with the twist grip member (34). This is achieved by simply clamping in known ways of clamping, shifter mechanism (25) to upper ends (34D) of twist grip (34). Moreover, when shifter (25) is so mounted, brake assembly (40) (as seen in FIG. 9) is typically also mounted to lower end (34E) of twist grip member (34). Then, rotation of twist grip member (34) will allow both shifter (25) and brake handle assembly to rotate therewith. Note that the handle of shifter (25) is typically pointing downward and the handle (40A) of brake assembly (40) is typically pointing upward.

In FIGS. 6A and 6B, it is seen that, in an alternate embodiment, both the shifter (25) and brake assembly (40) may be engaged rigidly to the lever, here at cap (38).

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

The invention claimed is:

1. A wheelchair comprising:
a frame;
a pair of separately driven rear wheels;
a front wheel assembly having a front wheel; and
a pair of lever drive assemblies, each having a drive lever, derailer assembly, and a chain for engaging a rear wheel, each drive lever assembly for independently driving one of the pair of rear wheels, wherein each drive lever includes a twist grip steering assembly having a twist grip member for engaging the front wheel assembly such that rotating the twist grip member of one drive lever will move the front wheel in a first direction and rotating the other twist grip member of the other drive lever will move the front wheel in a second direction;
wherein the front wheel assembly includes a steering head and a front fork assembly for engaging the front wheel, the front fork assembly pivotally engaged to the steering head, wherein each driver lever assembly has a cable with a cable housing, the cable first end engaging the twist grip member and the cable second end engaging the front fork assembly.

2. The wheelchair of claim 1, further comprising a pair of brake assemblies, one each for mounting on each one of the twist grip members.

3. The wheelchair of claim 2, wherein the brake assemblies are mounted such that a brake handle thereof is pointing up.

4. The wheelchair of claim 1, further comprising a pair of shifter mechanisms, one each for engaging each one of the derailer assemblies, the shifter mechanisms located at the removed ends of each drive lever.

5. The wheelchair of claim 4, wherein the shifter mechanisms are mounted to the twist grip members of each drive lever.

6. The wheelchair of claim 1, further comprising a pair of brake assemblies, one each for mounting on each one of the twist grip members such that a brake handle thereof is pointing up; and
further comprising a pair of shifter mechanisms, one each for engaging each one of the derailer assemblies, the shifter mechanisms located at the removed ends of each drive lever;
wherein the shifter mechanisms are mounted to the twist grip members.

7. The wheelchair of claim 1, wherein the cable housings are rigidly engaged to the frame adjacent the front fork assembly and the twist grip members.

8. The wheelchair of claim 1, wherein the frame includes a foot bar adjacent the steering head.

9. The wheelchair of claim 1, wherein the frame includes a pair of pulleys for engaging the cable second ends before the cable second ends engage the fork assembly.

10. The wheelchair of claim 1, further comprising a pair of brake assemblies, one each for mounting on each one of the twist grip members;
- further comprising a pair of shifter mechanisms, one each for engaging each one of the derailer assemblies, the shifter mechanisms located at the removed ends of each drive lever; wherein the shifter mechanisms are mounted to the twist grip members;
- wherein a first end of the cable housing is fixedly located adjacent the twist grip member;
- wherein a second end of the cable housing is rigidly engaged to the frame adjacent the fork assembly;
- wherein the frame includes a foot bar adjacent the steering head; and
- wherein the frame includes a pair of pulleys near the second end of the cable housing for engaging the second end of the cable.

11. The wheelchair of claim 1, wherein the wheelchair comprises only a single fron wheel assembly.

12. The wheelchair of claim 11, wherein the frame includes a foot bar.

13. The wheelchair of claim 11, wherein the cable housings are rigidly engaged to the frame adjacent the front fork assembly and the twist grip members.

14. The wheelchair of claim 11, wherein the frame includes a pair of pulleys for engaging the cable second ends before the cable second ends engage the fork assembly.

15. The wheelchair of claim 11, further comprising a pair of brake assemblies, one each for mounting on each one of the twist grip members.

16. The wheelchair of claim 11, wherein the brake assemblies are mounted such that a brake handle thereof is pointing up.

* * * * *